United States Patent
Niederhofer

(10) Patent No.: US 11,557,032 B2
(45) Date of Patent: Jan. 17, 2023

(54) DEVICE AND METHOD FOR THE CALIBRATED CHECKING OF A PRINTING ON AN ARTICLE

(71) Applicant: PHOENIX CONTACT GMBH & CO. KG, Blomberg (DE)

(72) Inventor: Marcus Niederhofer, Blomberg (DE)

(73) Assignee: PHOENIX CONTACT GMBH & CO. KG

( * ) Notice: Subject to any disclaimer, the term of this patent is extended or adjusted under 35 U.S.C. 154(b) by 0 days.

(21) Appl. No.: 17/290,967

(22) PCT Filed: Nov. 8, 2019

(86) PCT No.: PCT/EP2019/080754
§ 371 (c)(1),
(2) Date: May 3, 2021

(87) PCT Pub. No.: WO2020/094870
PCT Pub. Date: May 14, 2020

(65) Prior Publication Data
US 2022/0036529 A1  Feb. 3, 2022

(30) Foreign Application Priority Data
Nov. 9, 2018 (BE) .................................. 2018/5788

(51) Int. Cl.
*G06T 7/00* (2017.01)
*G06K 15/02* (2006.01)

(52) U.S. Cl.
CPC ............ *G06T 7/001* (2013.01); *G06K 15/027* (2013.01); *G06T 2207/20081* (2013.01); *G06T 2207/30144* (2013.01)

(58) Field of Classification Search
CPC ........ G06K 15/027; G06T 2207/20081; G06F 3/1256; G06F 3/1208
See application file for complete search history.

(56) References Cited

U.S. PATENT DOCUMENTS 6,606,395 B1 * 8/2003 Rasmussen ............ B41J 29/393
  358/3.1
7,440,123 B2 * 10/2008 Chodagiri ........... B41F 33/0036
  358/1.18
(Continued)

FOREIGN PATENT DOCUMENTS

EP  2463101 A1  6/2012
EP  2778892 A2  9/2014
(Continued)

OTHER PUBLICATIONS

International Searching Authority. International Search Report and Written Opinion for application PCT/EP2019/080754. dated Feb. 5, 2020. With machine translation. 29 pages.
(Continued)

*Primary Examiner* — King Y Poon
*Assistant Examiner* — Michael L Burleson
(74) *Attorney, Agent, or Firm* — Quarles & Brady LLP

(57) ABSTRACT

The present invention relates to an apparatus for calibrated testing of a printing of an article. The apparatus includes a data providing device adapted to provide printing data for the article from product data of the article and a camera device adapted to capture an image of an article printed by a printing process and to provide it as image data. The apparatus also includes a database device adapted to provide calibration data for the camera device and a computer device adapted to perform a quality check of the printing process based on a comparison of the printing data with the image data taking into account the calibration data.

10 Claims, 3 Drawing Sheets

```
<Steckverbinder>
<\Steckverbinder>
<1>
<2>
<3>
```

(56) References Cited

U.S. PATENT DOCUMENTS

| | | | |
|---|---|---|---|
| 2009/0323950 A1* | 12/2009 | Nakagata | G09C 5/00 |
| | | | 380/243 |
| 2011/0075193 A1 | 3/2011 | Kumamoto | |
| 2015/0062349 A1* | 3/2015 | Coon | H04N 9/735 |
| | | | 348/175 |
| 2017/0190194 A1* | 7/2017 | Zollner | B41J 2/2142 |

FOREIGN PATENT DOCUMENTS

| | | |
|---|---|---|
| EP | 2778892 A3 | 8/2017 |
| WO | 2017012642 A1 | 1/2017 |

OTHER PUBLICATIONS

Deutsches Patent und Markenamt. Office Action for application 102018219165.4. dated Jul. 7, 2019. With machine translation. 14 pages.

Belgian Patent Office. Search report for application BE201805788. dated Aug. 1, 2019. With machine translation. 22 pages.

\* cited by examiner

```
<Steckverbinder>
<\Steckverbinder>
<1>
<2>
<3>
```

Fig. 3

DEVICE AND METHOD FOR THE CALIBRATED CHECKING OF A PRINTING ON AN ARTICLE

CROSS-REFERENCE TO RELATED APPLICATIONS

This application is a U.S. National Phase of International Application No. PCT/EP2019/080754 filed Nov. 8, 2019 which claims the benefit of priority to Application No. BE 2018/5788 filed on Nov. 9, 2018, which are herein incorporated by reference in their entirety.

TECHNICAL FIELD

The present invention relates to systems for checking printing processes.

In particular, the present invention relates to a device and a method for calibrated testing of a printing of an or on article.

TECHNICAL BACKGROUND

Optical printing process verification of freely configurable articles cannot rely on databases of photographs of an article printing that complies with standards and quality standards.

An article can often be printed on a new, custom-configured article that has not yet been produced or has only been produced infrequently and for which no image data is therefore available for successful printing that meets quality standards.

Manual learning processes or conventional production control with optical systems and imaging processes as well as automatic optical inspection processes based on such image databases with a multitude of images of correctly performed printing processes are therefore often not possible for freely configurable articles and fail due to the availability of corresponding learning data and image databases.

SUMMARY OF THE INVENTION

It is an object of the present invention to provide an improved apparatus and method for inspecting a printing of an article.

This problem is solved by the subject matter and objects of the independent patent claims. Further embodiments can be found in the dependent patent claims, the description and the figures of the drawings.

A first aspect of the present invention relates to an apparatus for calibrated inspection of printing on an article, the apparatus comprising a data providing device, a camera device, a database device and a computer device.

The data providing device is adapted to provide printing data for the article from product data of the article.

The camera device is adapted to capture an image of an article printed by a printing process and to provide it as image data. The image of the printed article is digitized by means of an electronic image converter or image sensor and provided in the form of the image data.

The database device is configured to provide calibration data for the camera device.

The computer device is configured to perform a quality check of the printing process based on a comparison of the printing data with the image data, taking the calibration data into account. The computer device is adapted to perform automatic optical inspection procedures for correct printing of the article.

The present invention makes it possible to monitor printing of the product based on predicted characteristics using product data relating to a product assembled individually for a customer, without requiring learning data from previously performed and previously recorded printing operations for this purpose.

The present invention is based on the fact that learning data and inspection information are generated via known calibration data of the camera system, on the basis of which the image processing system can perform a quality control of the printed image.

The present invention enables search models and comparison models to be created for generating the synthetic learning data from the existing print data and the calibration data.

The search models allow the position of the print to be determined and allow more accurate alignment of the comparison models. The comparison models allow images as captured with the real camera image of the printed object to be compared with the generated learning data and inspection information. The generated learning data and inspection information can include virtual images or calculated partial views of the printed object. This allows an estimation of the quality level of the controlled printing.

Thus, the reliability of the monitoring of the printing process can be increased. Control devices can reliably detect an error case of the printing without ever having performed a corresponding printing on the printed article before. This provides a monitoring function for the printing process, which, particularly in the field of freely configurable and customer-specific assembled products, permits process control of the printing of articles newly created by configurator and variant configurator.

The present invention enables a quality check of the printing and a quality check of further article properties, whereby the required information is derived from the product data. This makes it possible to inspect newly created articles even without manual teach-in of the inspection system. Thus, no prototypes of the article are required, which are used solely for obtaining a reference image of a correctly printed article.

Further advantageous embodiments of the present invention can be found in the dependent claims.

In an advantageous embodiment of the present invention, it is provided that the computer device is adapted to generate learning data and/or inspection information for the quality inspection of the printing process in a learning phase of the computer device.

This advantageously also enables freely configurable, be it limitedly configurable or unlimitedly configurable articles, to be subjected to a printing process check and to check the printing even in the case of a new production of an article without requiring a large number of reference images which depict a correct printed image on model articles. Learning data can be calculated by software algorithm for any configured article.

In an advantageous embodiment of the present invention, it is provided that the computing device is adapted to generate inspection patterns for quality inspection of the printing process based on the learning data and/or inspection information by machine learning.

In an advantageous embodiment of the present invention, it is provided that the computer device is adapted to generate search models and/or comparison models by machine learning based on the recorded image data and/or on the calibration data as the test patterns for the quality test.

In an advantageous embodiment of the present invention, it is provided that the computer device is adapted to use the search models for a position determination of the print and/or for a calibrated alignment of an application of the comparison models to the captured image data.

In an advantageous embodiment of the present invention, it is provided that the computer device is adapted to compare a virtual image of the article with the image of the article captured by the camera device for the quality check of the printing process as the application of the comparison models and to generate a quality grade of the printing of the article.

In an advantageous embodiment of the present invention, it is provided that the product data is provided in a neutral data format.

In an advantageous embodiment of the present invention, it is provided that the neutral data format comprises an:
 i) XML format; and/or
 ii) platform-independent data format; and/or
 iii) implementation-independent data format; and/or
 iv) M2M data format.

In a second aspect of the present invention, there is provided a method for calibrated testing of a printing of an article, the method comprising the following method steps:

As a first method step, providing printing data for the article from product data of the article by means of a data providing device. Optionally, the product data is provided in a neutral data format.

As a second method step, an image of an article printed by a printing process is recorded by means of a camera device and image data is provided based on the recorded image by means of the camera device.

As a third method step, calibration data for the camera device is provided by means of a database device.

As a fourth method step, a quality check of the printing process is carried out based on a comparison of the printing data with the image data taking into account the calibration data by means of a computer device.

In an advantageous embodiment of the present invention, it is provided that the method further comprises the following method steps:

Generating learning data for the quality check of the printing process in a learning phase of the computer device; and/or Generating inspection information for the quality inspection of the printing process in a learning phase of the computer device.

In an advantageous embodiment of the present invention, it is provided that the method provides printing data in a neutral data format, and preferably the neutral data format comprises:
 i) XML format; and/or
 ii) platform-independent data format; and/or
 iii) implementation-independent data format; and/or
 iv) M2M data format In an advantageous embodiment of the present invention, it is provided that for the quality inspection of the printing process, based on the learning data and/or inspection information, inspection patterns for the quality inspection are generated by machine learning.

In an advantageous embodiment of the present invention, it is provided that the search models are used for a position determination of the print.

In an advantageous embodiment of the present invention, it is provided that an application of the comparison models to the captured image data is performed for a calibrated alignment.

According to an advantageous embodiment of the present invention, it is provided that for the quality check of the printing process, as the application of the comparison models, a virtual image of the article is compared with the image of the article captured by the camera device, and based thereon, a quality grade of the printing of the article is established.

According to a third aspect, the present invention comprises a data structure format which preferably comprises product data of the article present in a neutral data format and which is adapted to be used by a method for calibrated checking of a printing of an article according to one of the second aspect or any embodiment of the second aspect.

The described embodiments and further embodiments can be combined with each other as desired.

Other possible embodiments, further embodiments and implementations of the present invention also include combinations of features of the present invention described previously or hereinafter with respect to the embodiments that are not explicitly mentioned.

The accompanying drawings are intended to provide a further understanding of embodiments of the present invention.

The accompanying drawings illustrate embodiments and, in connection with the description, serve to explain concepts of the present invention.

Other embodiments and many of the advantages mentioned will be apparent with reference to the figures of the drawings. The elements shown in the figures of the drawings are not necessarily shown to scale with respect to each other.

BRIEF DESCRIPTION OF THE FIGURES

FIG. 3: shows a schematic representation of a data structure for calibrated testing of a printing of an article according to an embodiment of the present invention.

DETAILED DESCRIPTION OF THE EMBODIMENTS

In the figures of the drawings, identical reference signs designate identical or functionally identical elements, parts, components or process steps, unless otherwise indicated. The term "neutral data format" as used by the present invention includes, for example, data or file formats for neutral file exchange between units, such as computers, of a computer network.

The term "neutral data format" as used by the present invention can be understood, for example, as an intermediate file format for translating data between participating systems of the computer network, such as production systems or ordering systems—webshop—or internal data processing systems—backend.

In other words, a neutral file is generated from original data available in other file formats. However, the target system can read and process the neutral file unlike the original data.

The term "product data", in particular product data of the article, as used by the present invention describes, for example, data which define and classify an article, in particular according to customer-specific configuration. In other words, the product data describes and identifies parameters, characteristics, and design options of the article.

Figure 1:
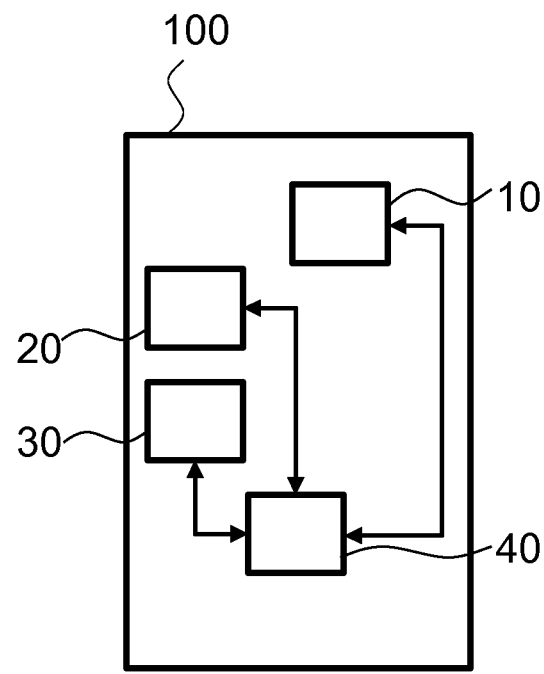
FIG. 1: shows a schematic representation of a device for calibrated testing of printing on an article according to an embodiment of the present invention.

FIG. 1 shows a schematic representation of a device for calibrated testing of a printing of an article according to an embodiment of the present invention.

The apparatus 100 includes a data providing device 10, a camera device 20, a database device 30, and a computer device 40.

The data providing device 10 is adapted to provide printing data for the article from product data of the article.

The camera device 20 is adapted to take an image of an article printed by a printing process and to provide it as image data. The database device 30 is adapted to provide calibration data for the camera device.

The calibration data for the camera device 20 may include, for example, learning data and inspection information, and may be associated with a respective type of the camera device 20, or may be selected in dependence on an illuminance prevailing when the image is captured, or may be selected in dependence on an illuminance prevailing when the image is captured by the camera device 20.

The computer device 40 is adapted to perform a quality check of the printing process based on a comparison of the printing data with the image data, taking into account the calibration data.

The present method enables printing process control of freely configurable articles. The device can be coupled with computer-aided product manufacturing systems and Internet-based product configuration systems, and provide autonomous and customizable verification systems via M2M communication.

Figure 2:
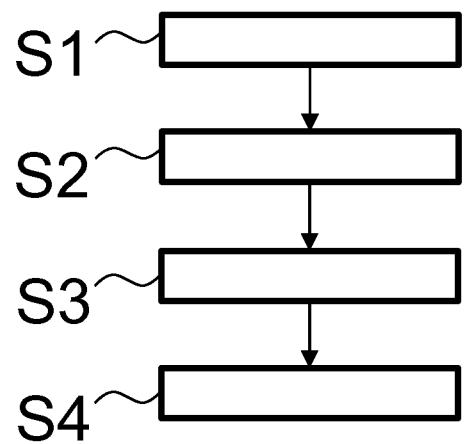
FIG. 2: shows a schematic representation of a flow chart of a method for calibrated testing of a printing of an article according to an embodiment of the present invention.

FIG. 2 shows a schematic diagram of a flowchart of a method for inspecting a printing of an article according to an embodiment of the present invention.

As a first method step, a providing S1 of printing data for the article is performed from product data of the article by means of a data providing device.

The neutral data format may be, for example, an XML format, a platform-independent data format, an implementation-independent data format, or an M2M data format.

As a second method step, an image of an article printed by a printing process is captured S2 by means of a camera device and image data is provided based on the captured image by means of the camera device.

As a third method step, calibration data for the camera device is provided S3 by means of a database device.

As a fourth process step, a quality check of the printing process is carried out S4 based on a comparison of the printing data with the image data, taking into account the calibration data, by means of a computer device.

Figure 3:
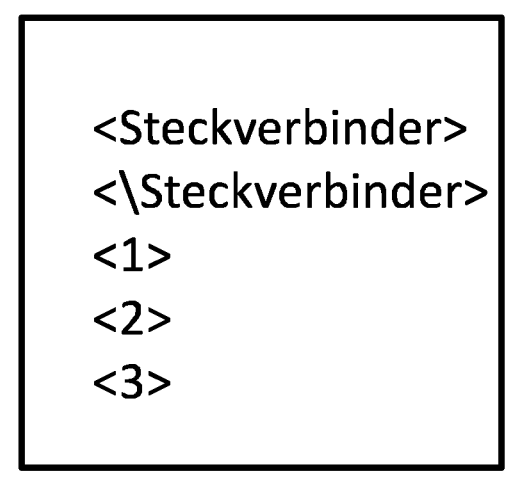

FIG. 3 shows a schematic representation of a data structure for calibrated checking of printing on an article in accordance with an embodiment of the present invention.

The data structure format shown in FIG. 3 can comprise the product data of the article present in a neutral data format. Further, the data structure format may be adapted to be used by a method for calibrated checking of a printing of an article.

Further, in the illustrated data structure format, the neutral data format may be an
   i) XML format; and/or
   ii) platform-independent data format; and/or
   iii) implementation-independent data format; and/or
   iv) M2M data format The data structure format may comprise hierarchically structured product data in a text file format.

Although the present invention has been described above with reference to preferred embodiments, it is not limited thereto, but can be modified in a variety of ways. In particular, the invention can be changed or modified in a variety of ways without departing from the essence of the invention.

Additionally, it should be noted that "comprising" and "comprising" do not exclude other elements or steps, and "one" or "a" do not exclude a plurality.

It should further be noted that features or steps that have been described with reference to any of the above embodiments may also be used in combination with other features or steps of other embodiments described above.

Reference signs in the claims are not to be regarded as a limitation.

The invention claimed is:

1. An apparatus for calibrated testing of a printing on an article, the apparatus comprising:
   a data providing device adapted to provide printing data for the article from product data of the article;
   camera device adapted to capture an image of an article printed by a printing process and provide it as image data;
   database device adapted to provide calibration data for the camera device;
   a computer device which is configured to carry out a quality check of the printing process based on a comparison of the printing data with the image data, taking into account the calibration data;
   wherein the computer device is designed to generate learning data or test information for the quality test of the printing process in a learning phase of the computer device; and
   wherein the computer device is designed to generate test patterns for the quality test of the printing process based on the learning data or test information for the quality test by machine learning.

2. The apparatus according to claim 1, wherein the computer device is designed to generate, as the test patterns for the quality test, search models or comparison models by machine learning based on the recorded image data or the calibration data.

3. The apparatus according to claim 2, wherein the computer device is adapted to use the search models for a position determination of the print or for a calibrated alignment of an application of the comparison models to the captured image data.

4. The apparatus according to claim 3, wherein the computer device is adapted to compare a virtual image of the article with the image of the article captured by the camera device for the quality check of the printing process as the application of the comparison models and to produce a quality grade of the printing of the article.

5. The apparatus according claim 1, wherein the data providing device is adapted to provide the printing data for the article from the product data of the article available in a neutral data format, and wherein preferably the neutral data format comprises at least one of:
   i) an XML format;
   ii) a platform-independent data format;
   iii) an implementation independent data format; or
   iv) an M2M data format.

6. A method for calibrated checking of a printing of an article, the method comprising steps comprising:
- providing printing data for the article from product data of the article by means of a data providing device;
- capturing an image of an article printed by a printing process by means of camera device, and providing image data based on the captured image by means of the camera device;
- providing calibration data for the camera device by means of database device;
- performing a quality check of the printing process based on a comparison of the printing data with the image data taking into account the calibration data by means of computer device
- generating learning data for the quality check of the printing process in a learning phase of the computer device or generating inspection information for the quality inspection of the printing process in a learning phase of the computer device; and
- wherein test patterns for the quality inspection of the printing process are generated by machine learning based on the learning data or inspection information.

7. The method according to claim 6, wherein for the quality check of the printing process, as the application of the comparison models, a virtual image of the article is compared with the image of the article taken by the camera device, and based thereon a quality grade of the printing of the article is established.

8. The method according to claim 6, wherein the printing data for the article is provided from the product data of the article available in a neutral data format, and wherein the neutral data format comprises at least one of:
i) an XML format;
ii) a platform-independent data format;
iii) an implementation independent data format; or
iii) an M2M data format.

9. The method according to claim 6, wherein further comprising generating, as the test patterns, search models or comparison models based on the recorded image data or the calibration data.

10. The method according to claim 9, wherein the search models are used for a position determination of the print, or wherein an application of the comparison models to the captured image data is performed for a calibrated alignment.

* * * * *